United States Patent
Schneider et al.

(10) Patent No.: US 10,583,799 B2
(45) Date of Patent: Mar. 10, 2020

(54) OVERHEAD INFLATABLE AIRBAG ASSEMBLY

(71) Applicant: Autoliv ASP, Inc., Ogden, UT (US)

(72) Inventors: David W. Schneider, Waterford, MI (US); Frank J. Herzenstiel, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 87 days.

(21) Appl. No.: 15/969,560

(22) Filed: May 2, 2018

(65) Prior Publication Data

US 2019/0337478 A1 Nov. 7, 2019

(51) Int. Cl.
| | |
|---|---|
| *B60R 21/214* | (2011.01) |
| *B60R 21/232* | (2011.01) |
| *B60R 21/2338* | (2011.01) |
| *B60R 21/00* | (2006.01) |

(52) U.S. Cl.
CPC .......... *B60R 21/214* (2013.01); *B60R 21/232* (2013.01); *B60R 21/2338* (2013.01); *B60R 2021/0044* (2013.01); *B60R 2021/0048* (2013.01); *B60R 2021/23382* (2013.01); *B60R 2021/23386* (2013.01)

(58) Field of Classification Search
CPC ........ B60R 21/232; B60R 2021/23386; B60R 2021/23153; B60R 21/213; B60R 21/214
See application file for complete search history.

(56) References Cited

U.S. PATENT DOCUMENTS

| | | | |
|---|---|---|---|
| 5,602,734 A | 2/1997 | Kithil | |
| 7,025,376 B2 | 4/2006 | Dominissini | |
| 7,828,322 B2 | 11/2010 | Breuninger et al. | |
| 8,414,017 B2* | 4/2013 | Lee | B60R 21/231 |
| | | | 280/730.1 |
| 8,622,417 B1 | 1/2014 | Schneider et al. | |
| 10,407,018 B2* | 9/2019 | Sundararajan | B60R 21/232 |
| 2002/0158450 A1 | 10/2002 | Hoeft et al. | |
| 2004/0174003 A1* | 9/2004 | Dominissini | B60R 21/233 |
| | | | 280/729 |
| 2005/0070414 A1 | 3/2005 | Schneider et al. | |

(Continued)

FOREIGN PATENT DOCUMENTS

WO    WO-2012144748 A2 * 10/2012 ........... B60R 21/232

OTHER PUBLICATIONS

International Search Report and Written Opinion dated Jul. 11, 2019 for international application PCT/US2019/030177.
U.S. Appl. No. 15/650,694, filed Jul. 14, 2017.

*Primary Examiner* — Ruth Ilan

(74) *Attorney, Agent, or Firm* — Stoel Rives LLP

(57) ABSTRACT

An overhead mountable inflatable airbag assembly for a vehicle is disclosed. Inflatable airbag assemblies may provide protection for an occupant in a vehicle collision event. The disclosed airbag assembly may form a sideways V shape to be supported at the roof by an inflator, housing, or other mounting method, and at or near a lower (distal) end against a portion of an instrument panel or a rear portion of a forward occupant seat. The supported sideways V shape may support the occupant during ride down to provide protection of the occupant. The supported sideways V shape may also reduce the volume of inflation gas required to properly inflate the airbag assembly, and may reduce the overall packaged volume of the airbag assembly.

21 Claims, 14 Drawing Sheets

(56) References Cited

U.S. PATENT DOCUMENTS

| | | | |
|---|---|---|---|
| 2005/0073135 A1* | 4/2005 | Choi | B60R 21/232 |
| | | | 280/730.1 |
| 2005/0206138 A1* | 9/2005 | Breuninger | B60R 21/231 |
| | | | 280/729 |
| 2006/0249943 A1 | 11/2006 | Bauer et al. | |
| 2010/0276015 A1 | 11/2010 | Breuninger et al. | |
| 2012/0133114 A1* | 5/2012 | Choi | B60R 21/214 |
| | | | 280/728.2 |
| 2012/0193896 A1* | 8/2012 | Turnbull | B60R 21/233 |
| | | | 280/729 |
| 2014/0375033 A1 | 12/2014 | Fukawatase | |
| 2015/0203066 A1* | 7/2015 | Pausch | B60R 21/231 |
| | | | 280/730.1 |
| 2017/0113646 A1* | 4/2017 | Lee | B60R 21/2338 |
| 2018/0222432 A1* | 8/2018 | Schneider | B60R 21/214 |
| 2019/0054888 A1* | 2/2019 | Fukawatase | B60R 21/232 |
| 2019/0161049 A1* | 5/2019 | Thomas | B60R 21/215 |
| 2019/0193666 A1* | 6/2019 | Jost | B60R 21/232 |

\* cited by examiner

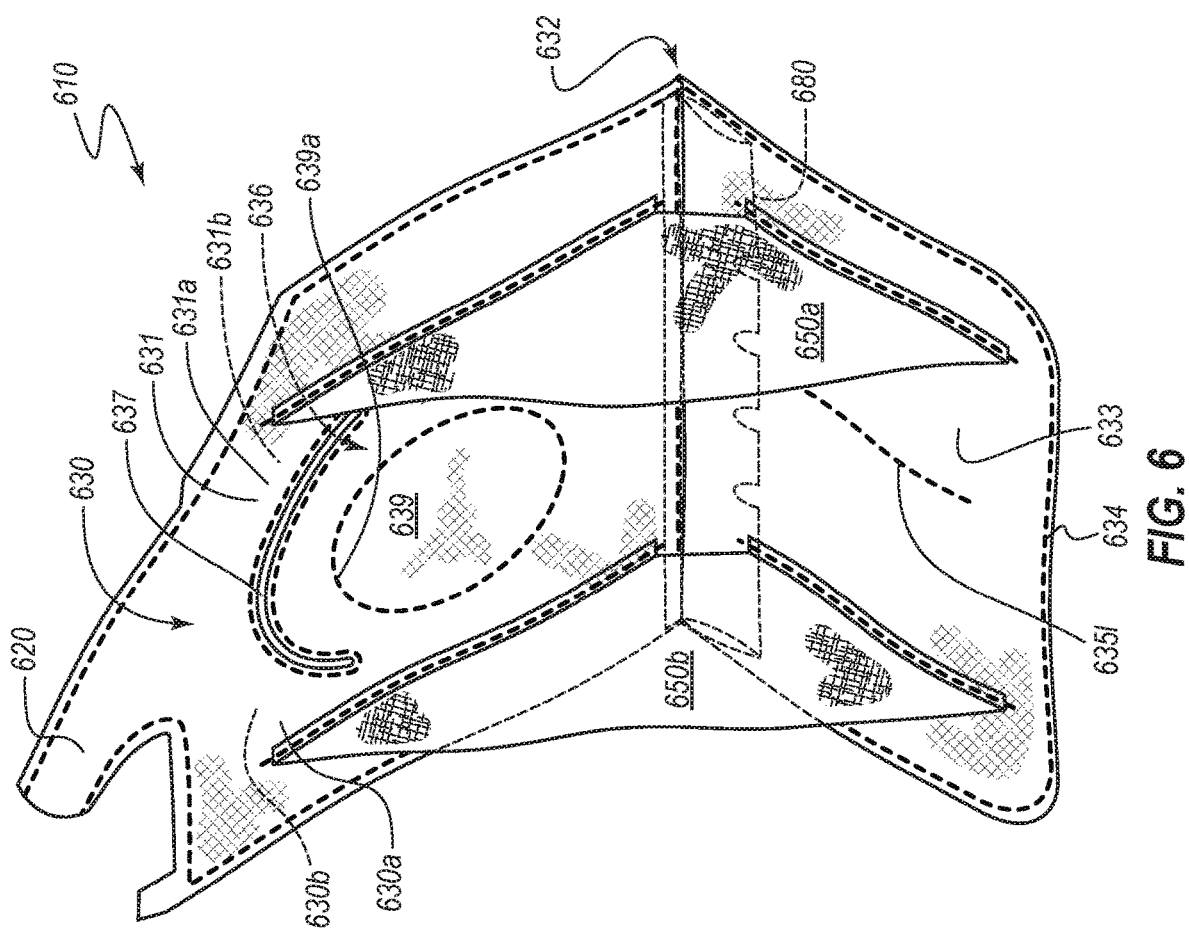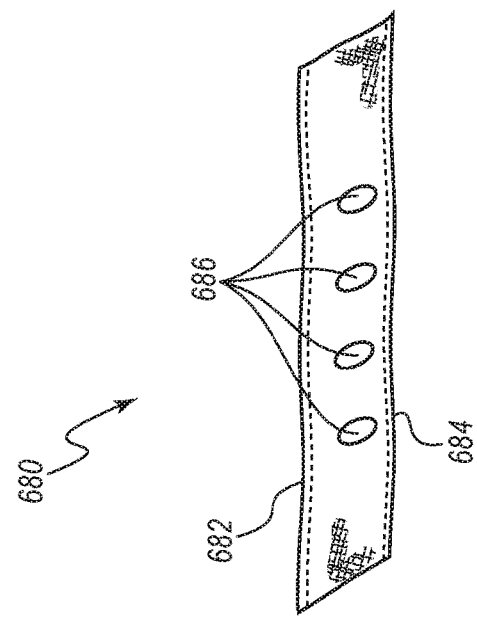

OVERHEAD INFLATABLE AIRBAG ASSEMBLY

TECHNICAL FIELD

The present disclosure relates generally to the field of automotive protective systems. More specifically, the present disclosure relates to airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 6 is a perspective view of another embodiment of an inflatable cushion of an overhead inflatable airbag assembly, the inflatable cushion in a deployed and uninflated state.

FIG. 7 is a detailed view of the internal tether of the inflatable chamber of FIG. 6.

DETAILED DESCRIPTION

Figure 1A:
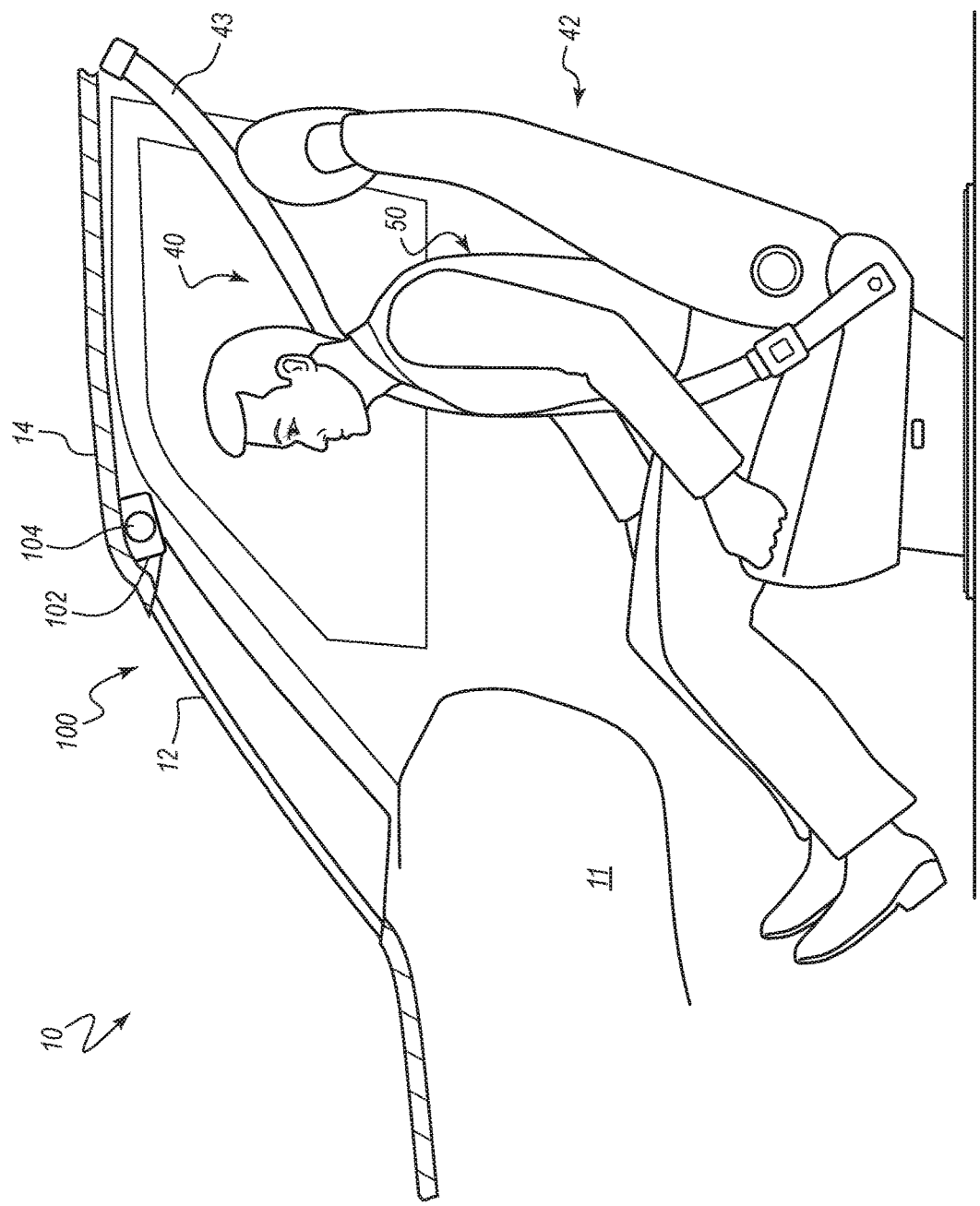
FIG. 1A is a side view of an interior of a vehicle having an overhead inflatable airbag assembly, according to one embodiment of the present disclosure.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "overhead inflatable airbag cushion" generally refers to an inflatable cushion that deploys from an overhead position (or from a position generally over a vehicle seating position) to protect an occupant during a collision event.

As used herein, the terms "dashboard" and "instrument panel" refer to a region of a vehicle faced by a motor vehicle occupant, which often includes a glove compartment in a portion thereof that faces a passenger and may include instruments (e.g., radio and/or climate controls) in a more central region thereof, although such instruments need not be present.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, stitching, etc.).

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The phrase "vehicle seating position" refers to a position in which an occupant is generally positioned when seated in a seat of a vehicle.

The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

During installation, airbags are typically disposed at an interior of a housing in a packaged state (e.g., are rolled, folded, and/or otherwise compressed) or a compact configuration and may be retained in the packaged state behind a cover. The disclosed mounting tab assemblies may reduce the volume of an airbag assembly when compacted and packaged for installation to a vehicle. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Some embodiments of overhead inflatable airbag assemblies that are disclosed herein are configured to cushion a front-seat passenger, and may be mounted in a roof of a vehicle, or in a structure above an occupant seating position, or within a seat-back portion of an occupant seat. An airbag assembly can mitigate injury to an occupant of a vehicle during a collision event by reducing the effect of impact of the occupant against structures (body-structure impact) within the vehicle (e.g., a dashboard or door column). The disclosed airbag assemblies can assist in injury mitigation by transferring at least some of the energies generated by an occupant impact on an airbag cushion to the vehicle.

FIG. 1A is a side view of an interior of a vehicle 10 an overhead inflatable airbag assembly 100 according, to one embodiment of the present disclosure. For reference, an instrument panel/dashboard 11, windshield 12, and roof 14 of the vehicle 10 are shown. A vehicle seating position 40 is shown. An occupant 50 is in the vehicle seating position 40 and facing forward relative to the vehicle 10. The occupant 50 is shown seated in an occupant seat 42 and buckled into an occupant restraint harness 43.

The overhead inflatable airbag assembly 100 may be mounted at or near a forward aspect of the interior of the roof 14 of the vehicle 10. The overhead inflatable airbag assembly 100 may include a housing 102 and an inflator 104. The overhead inflatable airbag assembly 100 is shown in an undeployed state in FIG. 1A.

Figure 1B:
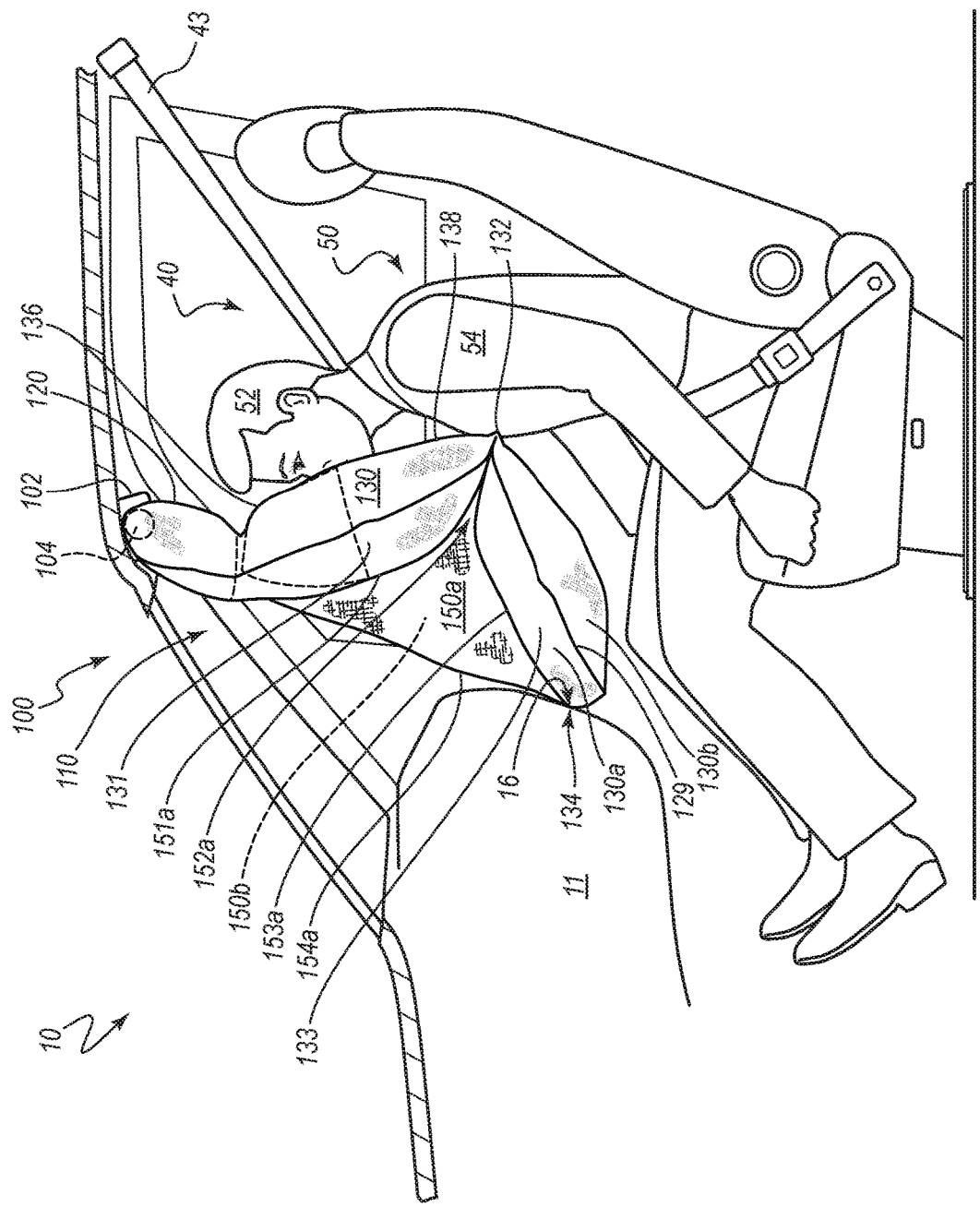
FIG. 1B is a side view of the interior of the vehicle with the overhead inflatable airbag assembly of FIG. 1A deployed and at least partially inflated.

FIG. 1B is a side view of the interior of the vehicle 10 with the overhead inflatable airbag assembly 100 of FIG. 1A deployed and at least partially inflated. The occupant 50 is shown in a position of near-contact with the overhead inflatable airbag assembly 100. The overhead inflatable airbag assembly 100 may have been activated by one or more sensors (not shown) detecting a collision event and triggering the inflator 104 to deliver inflation gas to an overhead inflatable airbag cushion 110 of the overhead inflatable airbag assembly 100. Delivery of inflation gas to the overhead inflatable airbag cushion 110 may cause the overhead inflatable airbag cushion 110 to deploy downward from the housing 102 and forward of the occupant 50. With the overhead inflatable airbag assembly 100 coupled at a forward aspect of the roof 14, and because the overhead inflatable airbag cushion 110 deploys downward, the overhead inflatable airbag cushion 110 may not interfere with the occupant restraint harness 43, and the occupant restraint harness 43 may not interfere with the overhead inflatable airbag cushion 110.

In some embodiments, the overhead inflatable airbag assembly 100 may include at least an inflation throat 120, a main chamber 130, an apex 132, and a distal end 134. The main chamber 130 may include an upper portion 131 and a lower portion 133, with the upper portion 131 disposed superior to the apex 132, and the lower portion 133 disposed inferior to the apex 132. The upper portion 131 and lower portion 133 may form a sideways V with the vertex of the sideways V being the apex 132. The main chamber 130 may also include a perimeter seam 129. The perimeter seam 129 may serve to couple together a forward facing panel 130a and an aft facing panel 130b of the main chamber 130. In an embodiment in which the main chamber 130 is formed of unitary panel construction, the perimeter seam 129 may be included to "turn" the edge of the main chamber 130. The overhead inflatable airbag cushion 110 may be formed of a single unitary panel of suitable material with appropriate cuts, fold, and seams, etc., or may be formed of multiple panels of suitable material coupled together at seams. Seams may be formed by sewing, adhesive, taping, radio-frequency (RF) welding, one-piece-woven (OPW) technologies, or any other suitable means, or any combination thereof.

The inflation throat 120 of the overhead inflatable airbag cushion 110 may couple to the inflator 104. When the inflator 104 is activated in the event of a collision event, the inflator 104 may generate inflation gas and direct the inflation gas to the inflation throat 120. The inflation throat 120, in turn, may introduce the inflation gas to the main chamber 130 of the overhead inflatable airbag cushion 110. The inflation throat 120 may also support the upper region of the main chamber 130 when the main chamber 130 is loaded by the occupant 50 impacting upon the main chamber 130 during a collision event.

The apex 132 of the main chamber 130 may be formed via one or more zero-length tethers, one or more internal tethers, or a combination of zero-length tethers and internal tethers. Zero-length tethers, in some embodiments, may be stitches that couple portions of the main chamber 130 together. The one or more tethers forming the apex 132 may be disposed at or near a midpoint of the main chamber 130. The one or more tethers forming the apex 132 also divide(s) the main chamber 130 to form the upper portion 131 and the lower portion 133 of the main chamber 130. The main chamber 130 and, more particularly, the lower portion 133 of the main chamber 130 may be so configured as to cause or otherwise facilitate the distal end 134 of the main chamber 130 to engage a reaction surface 16. The reaction surface 16 may be a portion of, or formed by a region of, the instrument panel/dashboard 11.

In some embodiments, the overhead inflatable airbag assembly 100 may further include a first sail panel tether 150a with an irregular quadrilateral shape. A second sail panel tether 150b may also be quadrilateral in shape, and basically mirror the first sail panel tether 150a. Each of the sail panel tethers 150a, 150b may couple to a forward aspect of the main chamber 130, relative to the vehicle 10. The first sail panel tether 150a may be situated inboard of a centerline of the main chamber 130, while the second sail panel tether 150b may be situated equidistant to the opposite side of the centerline of the main chamber 130. In one embodiment, the first sail panel tether 150a may be coupled at a perimeter seam 129 at an inboard side of the main chamber 130, and the second panel tether 150b may be coupled at the perimeter seam 129 at an outboard side of main chamber 130. With respect to the first sail panel tether 150a, a first side 151a may couple to an upper portion of the forward aspect of the main chamber 130, a second side 152a may be situated at or near the apex 132 of the main chamber 130, a third side 153a may couple to a lower portion of the forward aspect of the main chamber 130, and a fourth side 154a may be oriented forward toward the front of the vehicle 10. The second side 152a may be the shortest side of the first sail panel tether 150a, and may have a length approaching zero. The fourth side 154a may be the longest side of the first sail panel tether 150a. In other words, the first sail panel tether 150a may have a first edge (the second side 152a) extending from the upper portion 131 to the lower portion 133, and a second edge (the fourth side 154a) opposite the first edge (second side 152a) and extending from the upper portion 131 to the lower portion 133, with the first edge (second side 152a) shorter than the second edge (fourth side 154a). The second sail panel tether 150b is basically a mirror image of the first sail panel tether 150a. The length of the fourth side 154a, 154b of the sail panel tethers 150a, 150b is shorter than the length of the forward facing panel (see 230a in FIG. 4) of the main chamber 130. The first and third sides 151a, 151b, 153a, 153b of the sail panel tethers 150a, 150b couple to the upper portion 131 and the lower portion 133 of the main chamber 130, respectively, so as to draw the distal end 134 of the main chamber 130 toward the inflation throat 120 while disposing the apex 132 of the main chamber 130 rearward toward the vehicle seating position 40. In this manner, the distal end 134 of the main chamber 130 may be disposed against the reaction surface 16, and the apex 132 and a torso receiving region 138 of the main chamber 130 may be disposed to receive a torso 54 of the occupant 50 (the apex 132 is positioned to receive the torso 54 of the occupant 50). Similarly, a head receiving region 136 of the main chamber 130 may be disposed to receive a head 52 of the occupant (see FIG. 1C).

While the embodiment of FIG. 1B includes sail panel tethers 150a, 150b having a generally quadrilateral shape, other shapes of the sail panel tethers 150a, 150b are contemplated by the disclosure. For example, without limitation, the first sail panel tether 150a may have a triangular shape, with a first side coupled to a forward aspect of the upper portion 131 of the main chamber 130, a second side coupled to a forward aspect of the lower portion 133 of the main chamber, and a third side opposite the apex formed by intersection of the sides. The second sail panel tether 150b may generally mirror the triangular shape of the present example of the first sail panel tether 150a. Yet other shapes of the sail panel tethers 150a, 150b are contemplated.

Figure 5A:
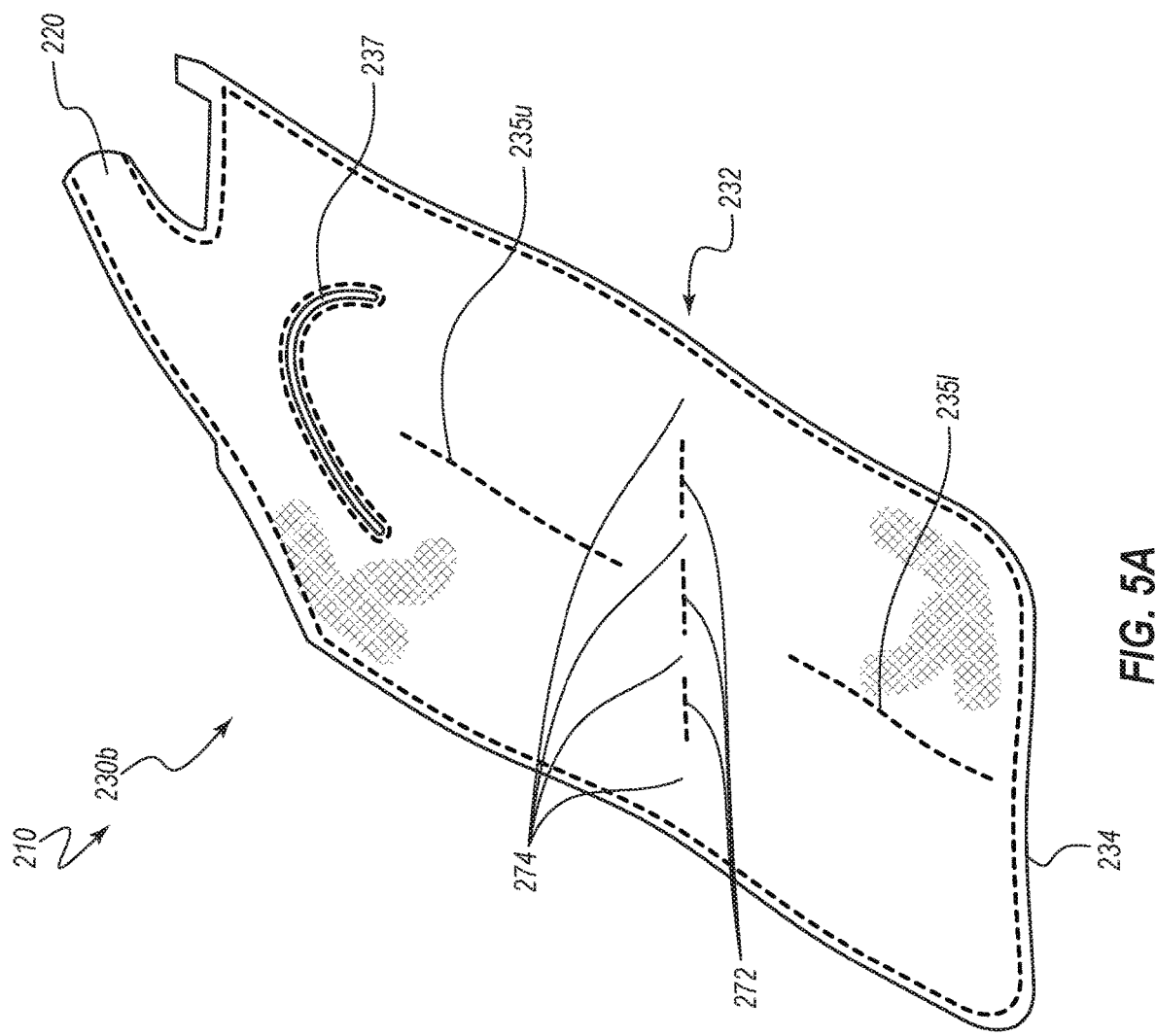
FIG. 5A is a detailed view of the aft facing panel of the inflatable cushion of FIG. 4.
Figure 5B:
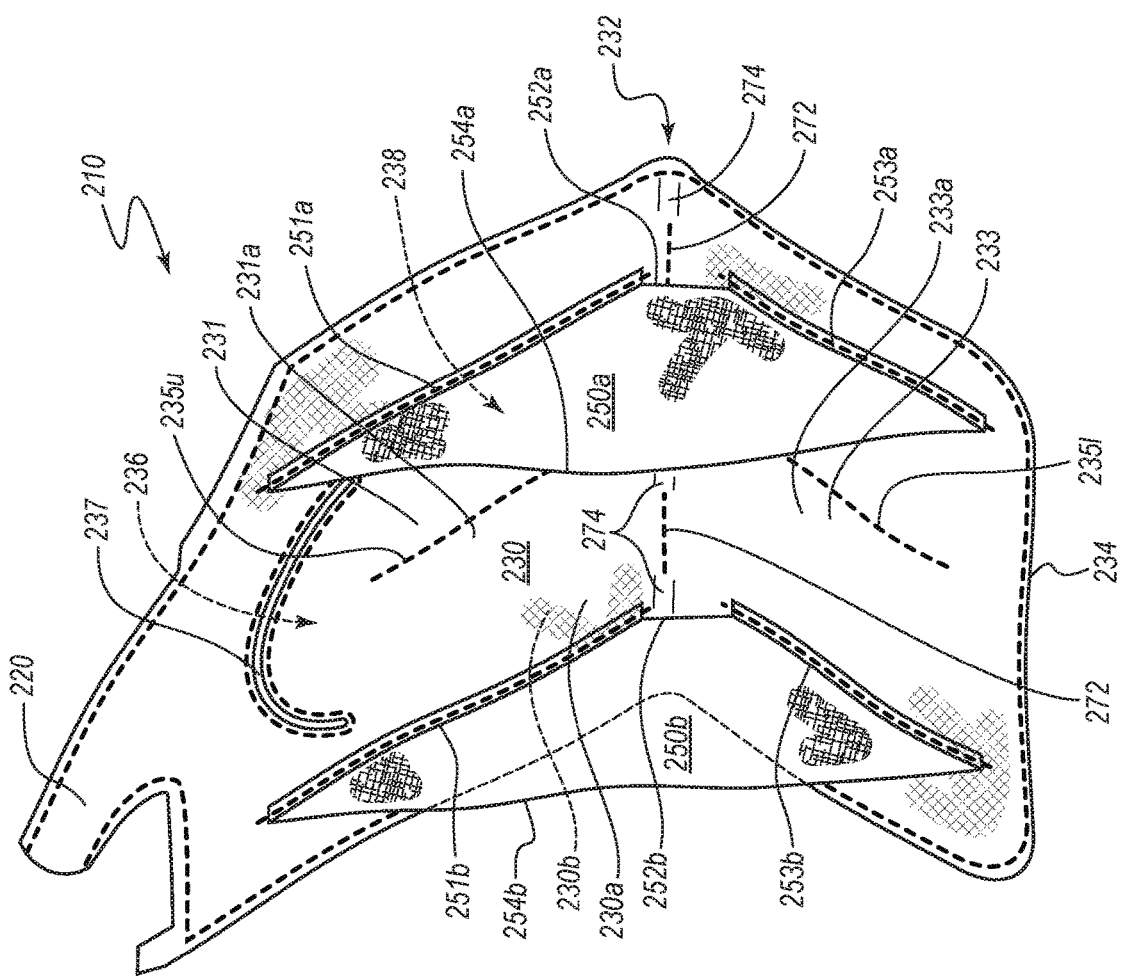
FIG. 5B is a perspective view of the inflatable cushion of FIG. 3 in a deployed and uninflated state.

In some embodiments, two sail panel tethers 150a, 150b may be coupled between the upper portion 131 and the lower portion 133 of the main chamber 130, with the two sail panel tethers 150a, 150b horizontally offset from each other (see FIG. 5B). In some embodiments, a single sail panel tether 150 may couple between the upper portion 131 and lower portion 133 of the main chamber 130, and be disposed along or near a vertical midline of the main chamber 130. A sail panel tether 150 may refer generally to the sail panel tether 150a, to the sail panel tether 150b, to both sail panel tethers 150a and 150b, to yet another sail panel tether (such as, e.g., a third, fourth, etc. sail panel tether), or to a combination of sail panel tethers 150a, 150b, etc. In yet another embodiment, three sail panel tethers 150 may couple between the upper portion 131 and lower portion 133 of the main chamber 130, with one of the three sail panel tethers 150 disposed at or near a vertical midline of the main chamber 130, another of the three sail panel tethers 150 disposed inboard of the vertical midline of the main chamber 130, and another sail panel tether 150 disposed equidistant to the opposite side of the vertical midline of the main chamber 130. Yet other configurations of a plurality of sail panel tethers 150 are contemplated by the disclosure.

Figure 1C:
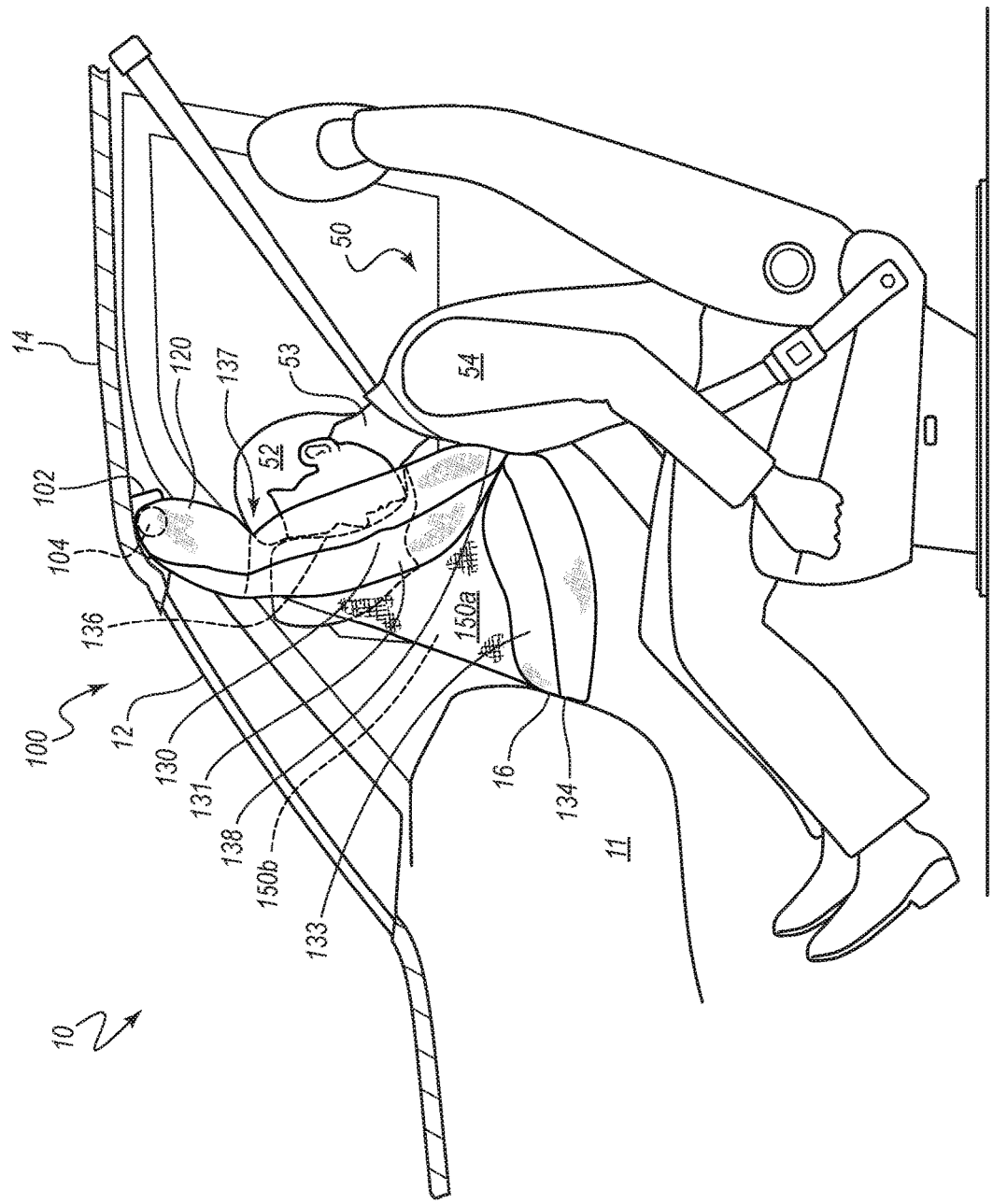
FIG. 1C is a side view of the interior of the vehicle having the overhead inflatable airbag assembly of FIGS. 1A-1B, with the occupant impacting the inflatable cushion.

FIG. 1C is a side view of the interior of the vehicle 10 having the overhead inflatable airbag assembly 100 of FIGS. 1A-1B, with the occupant 50 impacting the overhead inflatable airbag cushion 110. The head 52 of the occupant 50 may engage the head receiving region 136. In the embodiment illustrated in FIG. 1C, the main chamber 130 of the overhead inflatable airbag cushion 110 may include an arc-shaped slot, or flex aperture 137. The flex aperture 137 may allow the head receiving region 136 to translate somewhat forward (rotate forward) to accommodate the impact of the head 52 without potentially injurious deceleration of the head 52 or extension moment of a neck 53 of the occupant 50.

The torso 54 of the occupant 50 may simultaneously (or nearly so) engage the torso receiving region 138 of the main chamber 130. The sail panel tethers 150a, 150b may configure the overhead inflatable airbag cushion 110 such that the distal end 134 of the main chamber 130 remains engaged to the reaction surface 16 during ride down by the occupant 50. During ride down, the inflation throat 120 may remain coupled at or near the housing 102, or at or near the inflator 104, or at or near a forward aspect of the interior of the roof 14. The main chamber 130 may maintain the apex 132 (or a sideways V shape) and resist the occupant's 50 forward movement after the occupant 50 engages the main chamber 130.

When deployed, the distal end 134 may be disposed lower than the apex 132. In at least one embodiment, the distal end 134 may engage the reaction surface 16 immediately upon deployment and inflation. During ride down, the distal end 134 of the main chamber 130 may remain engaged to the reaction surface 16. With the distal end 134 disposed lower than the apex 132 and engaging the reaction surface 16, the lower portion 133 may not become displaced upward during ride down. Furthermore, the sail panel tethers 150a, 150b may prevent the lower portion 133 from becoming displaced downward during ride down. The sail panel tethers 150a, 150b may control the shape of the main chamber 130 after the occupant 50 engages the main chamber 130. In other words, as a result of the combination of the lower disposition of the distal end 134 relative to the apex 132 and the disposition of the sail panel tethers 150a, 150b, along with the inflated state of the main chamber 130, the lower portion 133 of the main chamber 130 may support the main chamber 130 and prevent the main chamber 130 from deforming during ride down so as to prevent or mitigate collision-related injury to the occupant 50.

With the overhead inflatable airbag cushion 110 disposed in this manner, the overhead inflatable airbag assembly 100 need not engage or derive support from the windshield 12 during deployment. Because the overhead inflatable airbag cushion 110 does not engage the windshield 12, and only engages with the reaction surface 16, the overall volume of the overhead inflatable airbag cushion 110 may be greatly diminished. With the smaller volume of the overhead inflatable airbag cushion 110, the inflator 104 may be one of a more compact design, yet provide ample inflation gas to rapidly and properly deploy and inflate the overhead inflatable airbag cushion 110.

Figure 2:
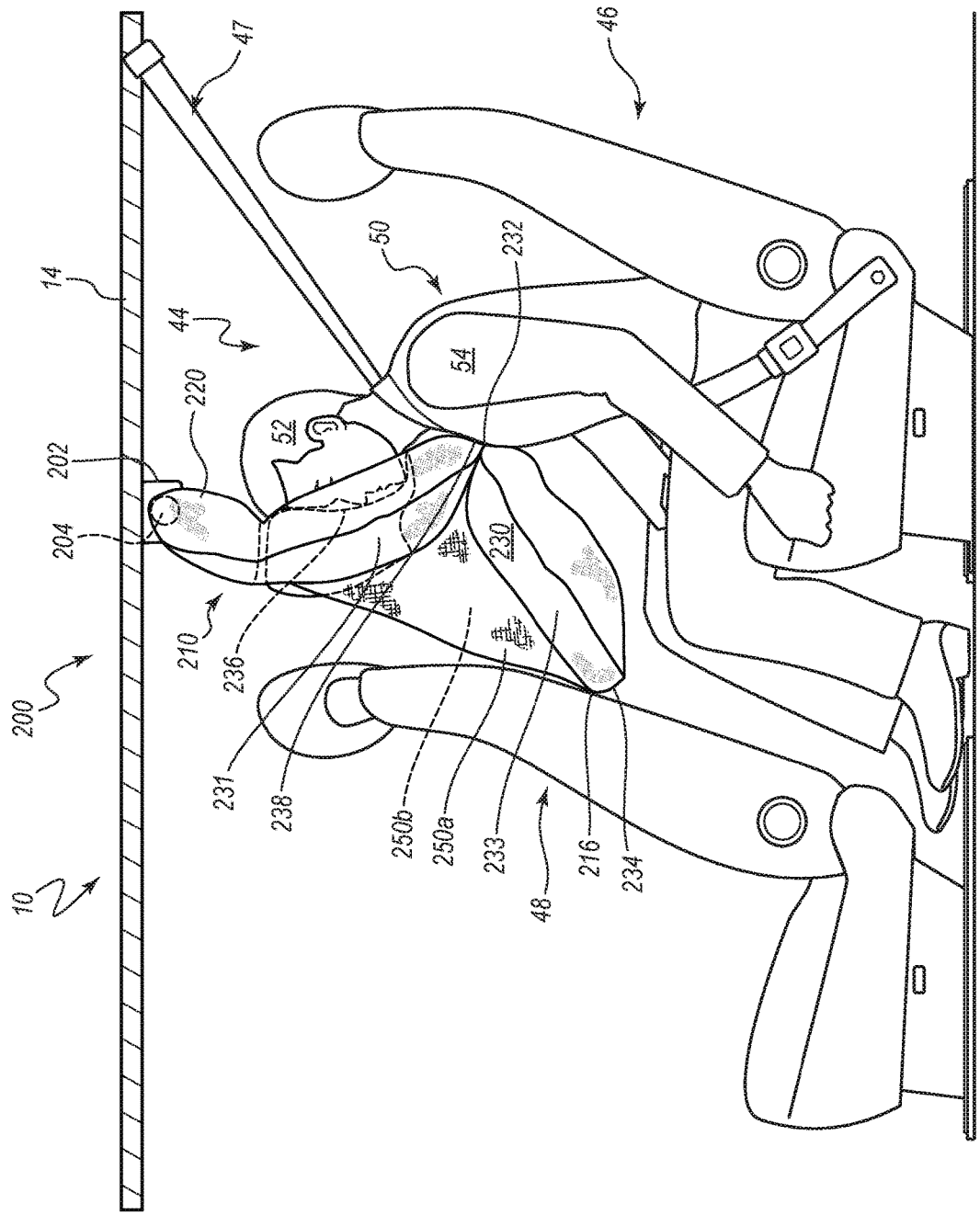
FIG. 2 is a side view of an interior of a vehicle having an embodiment of an overhead inflatable airbag assembly deployed and at least partially inflated, with the occupant impacting an inflatable cushion.

FIG. 2 depicts an embodiment of an overhead inflatable airbag assembly 200 that resembles the overhead inflatable airbag assembly 100 described above in certain respects. Accordingly, like features are designated with like reference numerals, with the leading digits incremented to "2." For example, the embodiment depicted in FIG. 2 includes an inflatable cushion 210 that may, in some respects, resemble the overhead inflatable airbag cushion 110 of FIGS. 1A-1C. Relevant disclosure set forth above regarding similarly identified features thus may not be repeated hereafter. Moreover, specific features of the overhead inflatable airbag assembly 100 and related components shown in FIGS. 1A-1C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the overhead inflatable airbag assembly 200 and related components depicted in FIG. 2. Any suitable combination of the features, and variations of the same, described with respect to the overhead inflatable airbag assembly 100 and related components illustrated in FIGS. 1A-1C can be employed with the overhead inflatable airbag assembly 200 and related components of FIG. 2, and vice versa. This pattern of disclosure applies equally to further embodiments depicted in subsequent figures and described hereafter, wherein the leading digits may be further incremented.

FIG. 2 is a side view of an interior of a vehicle 10 having an embodiment of an overhead inflatable airbag assembly 200 deployed and at least partially inflated, with the occupant 50 impacting an inflatable cushion 210. The occupant 50 may be in a vehicle seating position 44 and seated in a vehicle occupant seat 46 which is other than a first row vehicle occupant seat. In other words, the vehicle occupant seat 46 may be a second row seat, or a third row seat, etc. A vehicle occupant seat 48 is shown forward of the vehicle occupant seat 46. The vehicle occupant seat 48 may be a first row seat (analogous to 42 in FIG. 1A) or a second row seat, etc. The occupant 50 is shown wearing an occupant restraint harness 47.

The overhead inflatable airbag assembly 200 is, in many respects similar to the overhead inflatable airbag assembly 100 of FIGS. 1A-1C. For example without limitation, the overhead inflatable airbag assembly 200 may include a housing 202, an inflator 204, and an inflatable cushion 210. Similarly, the inflatable cushion 210 may include an inflation throat 220, a main chamber 230, and a distal end 234. The main chamber 230 may include an upper portion 231, an apex 232, and a lower portion 233. The overhead inflatable airbag assembly 200 may also include a pair of sail panel tethers 250a, 250b.

In some embodiments, the overhead inflatable airbag assembly 200 may be mounted at the roof 14 of the vehicle 10 at a location forward of the rearward vehicle occupant seat 46 and aft of the forward vehicle occupant seat 48. When the overhead inflatable airbag assembly 200 deploys and inflates, the distal end 234 may be disposed against a reaction surface 216. The reaction surface 216 may be a rear aspect of the vehicle occupant seat 48. In other words, the distal end 234 may engage against a rear portion of the forward vehicle occupant seat 48 that is immediately forward of the rearward vehicle occupant seat 46 and the relevant vehicle occupant position 44.

Similar to the embodiment of FIGS. 1A-1C, the head 52 of the occupant 50 may engage and be supported by a head receiving region 236, and the torso 54 of the occupant 50 may engage and be supported by a torso receiving region 238. During ride down, the inflatable cushion 210 may be supported in a manner similar to that shown in FIG. 1C. In other words, the inflation throat 220 may be coupled at or near the housing 202, at or near the housing 202, or at or near an interior point of the roof 14 near the housing 202. The distal end 234 may engage and react against the reaction surface 216. The disposition of the sail panel tethers 250a, 250b and the inflated state of the inflatable cushion 210 may support the occupant 50 during ride down so as to prevent or mitigate collision-related injury.

Figure 3:
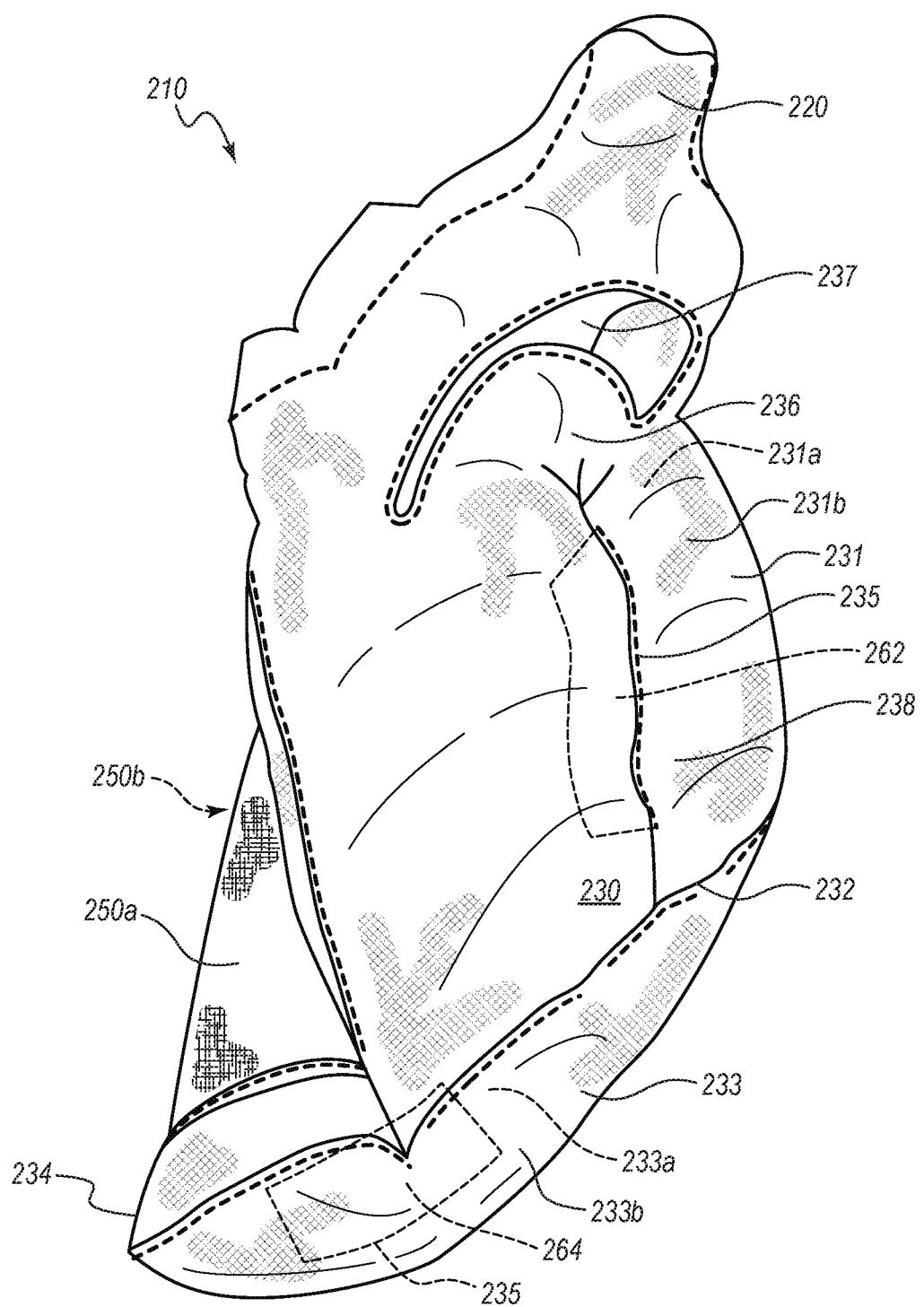
FIG. 3 is a perspective view of the inflatable cushion of the overhead inflatable airbag assembly of FIG. 2 in an inflated state.

FIG. 3 is a perspective view of the inflatable cushion 210 of the overhead inflatable airbag assembly 200 of FIG. 2 in an inflated state. The inflation throat 220 is shown, along with the main chamber 230. The main chamber 230 includes the upper portion 231 and lower portion 233. The upper portion 231 and lower portion 233 couple to each other at the apex 232. In other words, the apex 232 can divide the main chamber 230 into the upper portion 231 and lower portion 233. The distal end 234 is also shown, as are the sail panel tethers 250a, 250b.

The upper portion 231 includes a forward facing panel 231a and an aft facing panel 231b. An upper internal vertical tether 262 may couple to an interior surface of the forward facing panel 231a and to an interior surface of the aft facing panel 231b at or near a midline 235 of the main chamber 230. The upper internal vertical tether 262 may limit the expansion of the upper portion 231 of the main chamber 230 to both assist in configuring the head receiving region 236 and torso receiving region 238, and to reduce the volume of inflation gas required to deploy and inflate the inflatable cushion 210. A flex aperture 237 may allow the head receiving region 236 to translate somewhat forward (rotate forward) to accommodate the impact of the head 52 in a manner to minimize potentially injurious deceleration of the head 52.

The lower portion 233 includes a forward facing panel 233a and an aft facing panel 233b. A lower internal vertical tether 264 may couple to an interior surface of the forward facing panel 233a and to an interior surface of the aft facing panel 233b at or near a midline 235 of the main chamber 230. The lower internal vertical tether 264 may limit the expansion of the lower portion 233 of the main chamber 230 to both assist in configuring and disposing the distal end 234, and to reduce the volume of inflation gas required to deploy and inflate the inflatable cushion 210.

Figure 4:
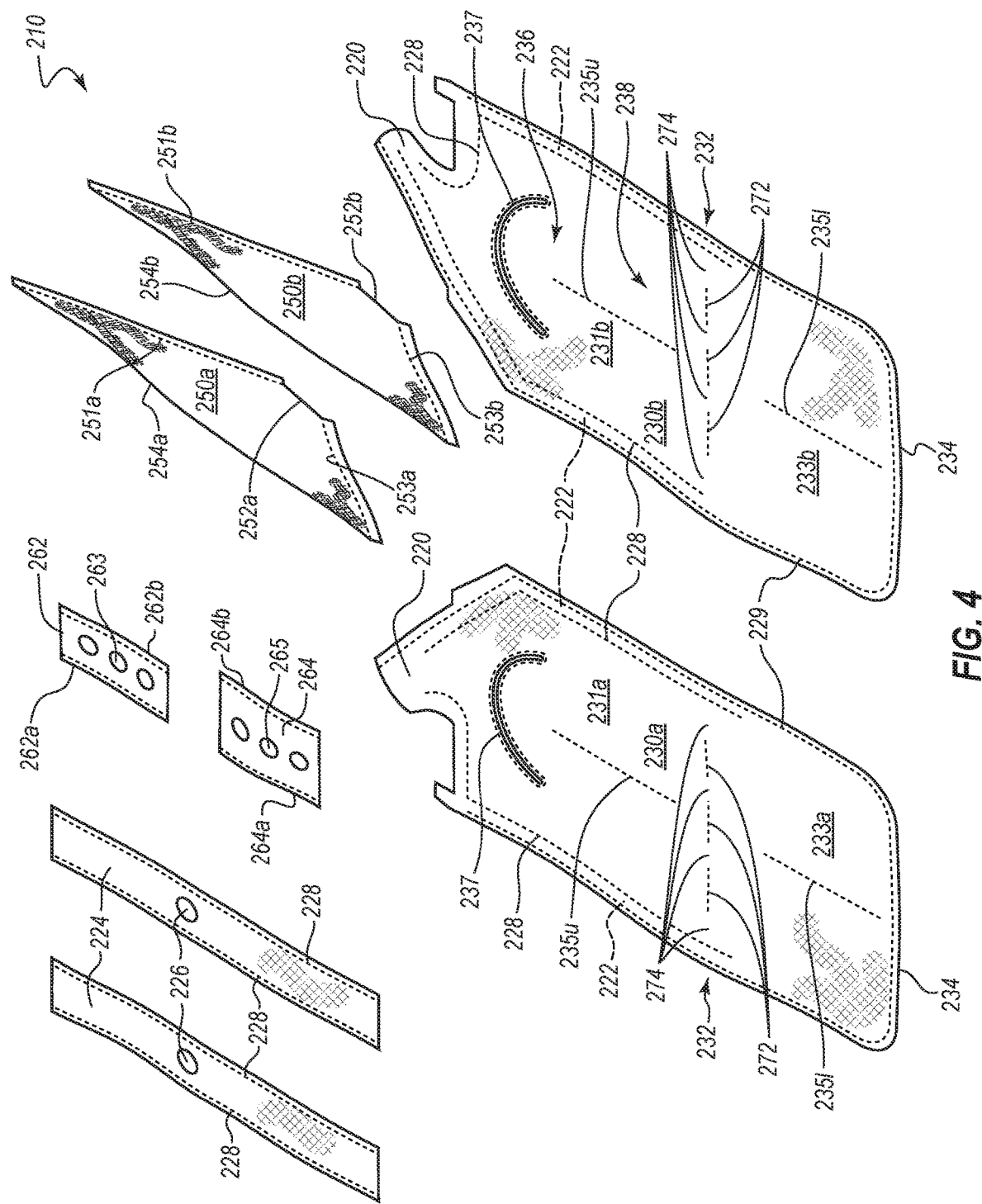
FIG. 4 illustrates panels forming the inflatable cushion of FIG. 3.

FIG. 4 illustrates a plurality of panels forming the inflatable cushion 210 of FIG. 3. A forward facing panel 230a and an aft facing panel 230b may be coupled together at the outer edges to form the main chamber (see 230 in FIGS. 2-3). The forward facing panel 230a includes a portion to form the forward facing panel 231a of the upper portion 231 of the main chamber 230, and a portion to form the forward facing panel 233a of the lower portion 233 of the main chamber 230. Likewise, the aft facing panel 230b includes a portion to form the aft facing panel 231b of the upper portion 231 and a portion to form the aft facing panel 233b of the lower portion 233 of the main chamber 230. The head receiving region 236 and torso receiving region 238 are shown on the aft facing panel 230b. The flex aperture 237 for the head receiving region 236 is shown. The inflation throat 220 is also shown.

The forward facing panel 230a and the aft facing panel 230b are each shown having a plurality, or series, of zero-length tethers 272 disposed horizontally across the panels 230a, 230b. The zero-length tether 272 may be a series of stitches that couple the forward facing panel 230a and the aft facing panel 230b together, to form the apex 232. In other words, the main chamber 230 may include a plurality of zero-length tethers 272 disposed along the apex 232. A series of gaps 274 are shown between the zero-length tethers 272. The gaps 274 may permit inflation gas to communicate fluidly between the upper portion 231 and lower portion 233 of the main chamber 230.

Both the forward facing and aft facing panels 230a, 230b are shown with an upper midline 235u and lower midline 235l. The upper and lower midlines 235u, 235l are generally along the same vertical line, and approximately bisect the main chamber 230 laterally. A first edge 262a of the upper internal vertical tether 262 may couple to an interior surface of the forward facing panel 230a along or near the upper midline 235u. A second edge 262b of the upper internal vertical tether 262 may couple to an interior surface of the aft facing panel 230b along or near the upper midline 235u. A first edge 264a of the lower internal vertical tether 264 may couple to an interior surface of the forward facing panel 230a along or near the lower midline 235l. A second edge 264b of the lower internal vertical tether 264 may couple to an interior surface of the aft facing panel 230b along or near the lower midline 235l.

In at least one embodiment, the inflatable cushion 210 may comprise one or more fill tubes 222 to assist in directing a portion of the flow of inflation gas from the inflation throat 220 toward the distal end 234 of the main chamber 230. Each inflation tube 222 may be formed by coupling an inflation tube panel 224 at an interior portion of the main chamber 230 at inflation tube coupling seams 228 near the perimeter seam 229. The inflation tube panel 224 may comprise apertures 226 to assist in delivering inflation gas to a mid-section of the main chamber 230. In the illustrated embodiment of FIG. 4, the inflation tube panels 224 each have a single aperture 226, however, this disclosure is not so limited and the inflation tube panels 224 may have more than one aperture 226.

Two sail panel tethers 250a, 250b are shown. Each sail panel tether 250a, 250b has, respectively, a first side 251a, 251b, a second side 252a, 252b, a third side 253a, 253b, and a fourth side 254a, 254b. The disposition of the two sail panel tethers 250a, 250b is described above. As noted above, while the two sail panel tethers 250a, 250b are depicted having an irregular quadrilateral shape, other shapes are contemplated by the disclosure. For example without limitation, in at least one embodiment, each sail panel tether 250a, 250b may have a quadrilateral shape. In another embodiment, each sail panel tether 250a, 250b may have a generally triangular shape, having respectively sides 251a, 251b, 253a, 253b, and 254a, 254b.

In the embodiment of FIG. 4, the forward facing panel 230a and aft facing panel 230b are shown as two distinct panels. In another embodiment, the two panels 230a, 230b may be formed of a single, contiguous fabric panel. In one embodiment, the forward facing panel 230a, or the aft facing panel 230b may include the first and/or second sail tether panel(s) 250a, 250b as unitary portions. In other words, either the forward or the aft facing panel 230a, 230b may include both sail tether panels 250a, 250b, OR the forward facing panel 230a may include either the first or the second sail tether panel 250a, 250b while the aft facing panel 230b includes the other of the first or second sail tether panels 250a, 250b. In one embodiment, the forward and aft facing panels 230a, 230b and the first and second sail tether panels 250a, 250b may be formed of a single unitary fabric panel.

FIG. 5A is a detailed view of the aft facing panel 230b of the inflatable cushion 210 of FIG. 4. The inflation throat 220, apex 232, and distal end 234 are shown for reference. The upper and lower midlines 235u, 235l are also shown for reference. The series of zero-length tethers 272 is shown, along with the gaps 274 to afford fluid communication throughout the main chamber 230. The embodiment of FIG. 5A shows three zero-length tethers 272, and four gaps 274 flanking the zero-length tethers 272. The number of zero-length tethers 272 may be more than or fewer than three. Likewise, the number of gaps 274 may be more than or fewer than four. As may be appreciated from FIG. 4, the forward facing panel 230a has a matching series of zero-length tethers 272 and gaps 274. The zero-length tethers 272 of the forward facing panel 230a and the aft facing panel 230b are the same zero-length tethers. In other words, the zero-length tethers 272 are formed to couple an inner surface of the forward facing panel 230a to a matching inner surface of the aft facing panel 230b. The zero-length tethers 272 may be formed as seams, using stitching, adhesive, taping, RF welding, one-piece-woven (OPW) technologies, or by any other suitable method, or by any suitable combination thereof. The zero-length tethers 272 may serve to form the apex 232 such that the main chamber 230 comprises the upper portion 231 and lower portion 233.

FIG. 5B is a perspective view of the inflatable cushion 210 of FIG. 3 in a deployed and uninflated state. The inflation throat 220, flex aperture 237, and distal end 234 are shown for reference. The forward facing panel 230a and aft facing panel 230b of the main chamber 230 are also shown for reference. The sail panel tethers 250a, 250b are shown coupled to the forward facing panel 230a of the main chamber 230. With respect to the first sail panel tether 250a, the first side 251a couples to an upper portion 231 of the forward facing panel 230a. The third side 253a couples to a lower portion 233 of the forward facing panel 230a. The second side 252a may be disposed near or at the apex 232 of the main chamber 230. In the illustrated embodiment of FIG. 5B, the second side 252a is displaced a distance from the forward facing panel 230a at the apex 232 to form a gap or opening. The fourth side 254a is opposite the second side 252a and further displaced from the apex 232. The first sail panel tether 250a may be disposed at a location inboard of the upper and lower midlines 235u, 235l of the main chamber 230. The second sail panel tether 250b is similarly coupled to the forward facing panel 230a and at a location equidistant outboard of the upper and lower midlines 235u, 235l. In other words, the two sail panel tethers 250a, 250b are offset by an offset distance from the upper and lower midlines 235u, 235l.

The upper internal vertical tether (see 262 in FIG. 4) may couple the forward facing panel 230a and the aft facing panel 230b at or near the upper midline 235u. The lower internal vertical tether (see 264 in FIG. 4) may couple the forward facing panel 230a and aft facing panel 230b at or near the lower midline 235l. The upper internal vertical tether 262 may assist in disposing and configuring the head receiving region 236. The lower internal vertical tether 264 may assist in disposing and configuring the lower portion 233 of the main chamber 230 such that the distal end 234 may engage and be supported by the reaction surface (see 16 in FIG. 1C and 216 in FIG. 2). In other embodiments, the upper internal vertical tether 262 may instead be a zero-length tether. Similarly, in some embodiments, the lower internal vertical tether 264 may be a zero-length tether.

In some embodiments, individually coupling the two sail panel tethers 250a, 250b to the forward facing panel 230a as shown in FIG. 5B may create a turning point in the main chamber 230 comprising the apex 232. The series of zero-length tethers 272 and gaps 274 are at least partially shown. The zero-length tethers 272 are disposed horizontally across and connecting the forward facing panel 230a and aft facing panel 230b at or near the apex 232. The zero-length tethers 272 may assist in turning the main chamber 230 at the apex 232. The gaps 274 permit fluid communication of inflation gas throughout the main chamber 230. The disposition of the sail panel tethers 250a, 250b and formation of the apex 232 may dispose the main chamber 230 such that the upper portion 231 of the main chamber 230 may extend in a direction toward the vehicle seating position (see the vehicle occupant position 40 in FIG. 1A and the vehicle occupant position 44 in FIG. 2) and the lower portion 233 of the main chamber 230 may extend in a direction away from the vehicle seating position with the upper and lower portions 231, 233 of the main chamber 230 forming an apex 232 at the change in direction.

While the embodiment of FIG. 5 shows two sail panel tethers 250a, 250b, the disclosure contemplates embodiments having, for example and without limitation, one sail panel tether 250 coupled at, along, or near the midlines 235u, 235l; three sail panel tethers 250 having one coupled along or near the midlines 235u, 235l and the others equidistant to either side of the midlines 235u, 235l, etc.; or yet more sail panel tethers 250x.

FIG. 6 is a perspective view of another embodiment of an inflatable cushion 610 of an overhead inflatable airbag assembly, the inflatable cushion 610 in a deployed and uninflated state. An inflation throat 620 and a distal end 634 are shown for reference. A forward facing panel 630a and an aft facing panel 630b of a main chamber 630 are also shown. In the embodiment of FIG. 6, a non-inflatable zone 639 is disposed in the upper portion 631 of the main chamber 630. The non-inflatable zone 639 may be formed by a seam 639a coupling an interior surface of the upper portion of the forward facing panel 631a to an interior surface of the upper portion of the aft facing panel 631b. The non-inflatable zone 639 may be disposed below the flex aperture 637 and above the apex 632 so as to form at least a portion of the head receiving region 636.

An internal tether 680 may be disposed at the apex 632 formed by the turning of the main chamber 630 as a result of the two sail panel tethers 650a, 650b such that the internal tether 680 may supplant the series of zero-length tethers (see 272 in FIGS. 4, 5A, and 5B). In other words, the main chamber 630 may include an internal tether 680 disposed within the main chamber 630 and along the apex 632.

The lower internal vertical tether (see 264 in FIG. 4) may be disposed within the lower portion 633 of the main chamber 630 along or near the lower midline 635l. In another embodiment, the lower midline 635l may locate a zero-length tether coupling together the forward facing and aft facing panels 630a, 630b of the lower portion 633 of the main chamber 630.

FIG. 7 is a detailed view of the internal tether 680 of the inflatable cushion 610 of FIG. 6. The internal tether 680 comprises a first edge 682, a second edge 684, and one or more aperture(s) 686. The first edge 682 may couple to an interior surface of the forward facing panel (see 630a in FIG. 6) at or near the apex 632 of the main chamber 630. The second edge 684 may couple to an interior surface of the aft facing panel (see 630b in FIG. 6) at or near the apex 632 of the main chamber 630.

As the inflatable cushion 610 begins to inflate, the main chamber 630 may begin to expand. As the main chamber 630 begins to expand, inflation gas may communicate fluidly into the lower portion 633 of the main chamber 630 and thence throughout the main chamber 630 by means of the apertures 686.

Figure 8:
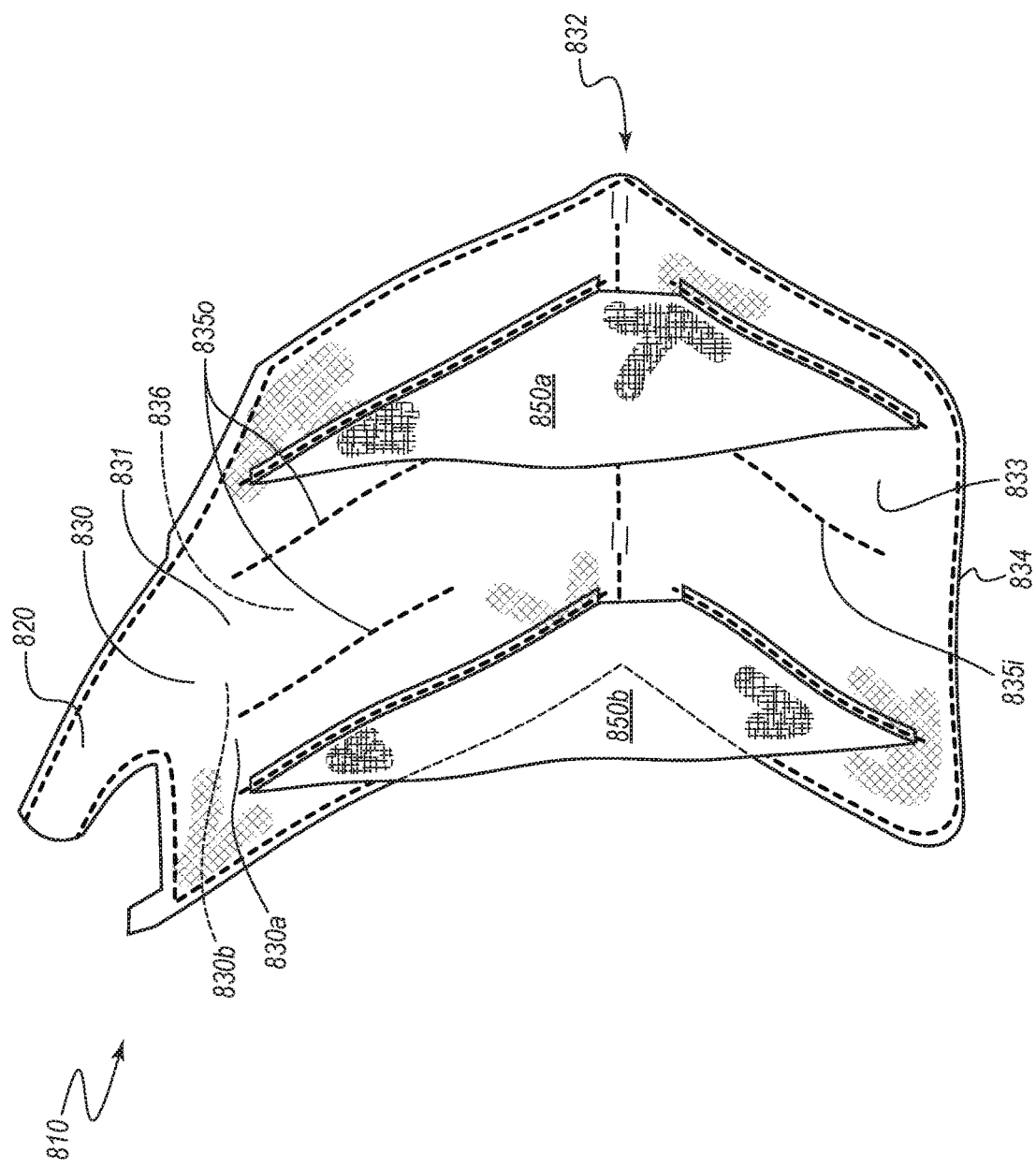
FIG. 8 is a perspective view of another embodiment of an inflatable cushion of an overhead inflatable airbag assembly, the inflatable cushion in a deployed and uninflated state.

FIG. 8 is a perspective view of another embodiment of an inflatable cushion 810 of an overhead inflatable airbag assembly 800, the inflatable cushion 810 in a deployed and uninflated state. An inflation throat 820, an apex 832, and a distal end 834 are shown. First and second sail panel tethers 850a, 850b are also shown. Two offset loci 835o are shown. Each of the offset loci 835o may be vertically disposed at or approximately equidistant from a midline of the upper portion 831 of the main chamber 830. In the embodiment of FIG. 8, an upper internal vertical tether (analogous to upper internal vertical tether 262 of FIGS. 4 and 5A) may couple at each of two offset loci 835o and between the forward facing panel 830a and the aft facing panel 830b at the upper portion 831 of the main chamber 830. In some embodiments, the two offset loci 835o may locate zero-length tethers. A lower internal vertical tether (analogous to lower internal vertical tether 264 of FIGS. 4 and 5A) may couple the forward facing panel 830a and aft facing panel 830b within the lower portion 833 of the main chamber 830 at or near the lower midline 835i In some embodiments, the lower midline 835i may locate a zero-length tether.

Figure 9:
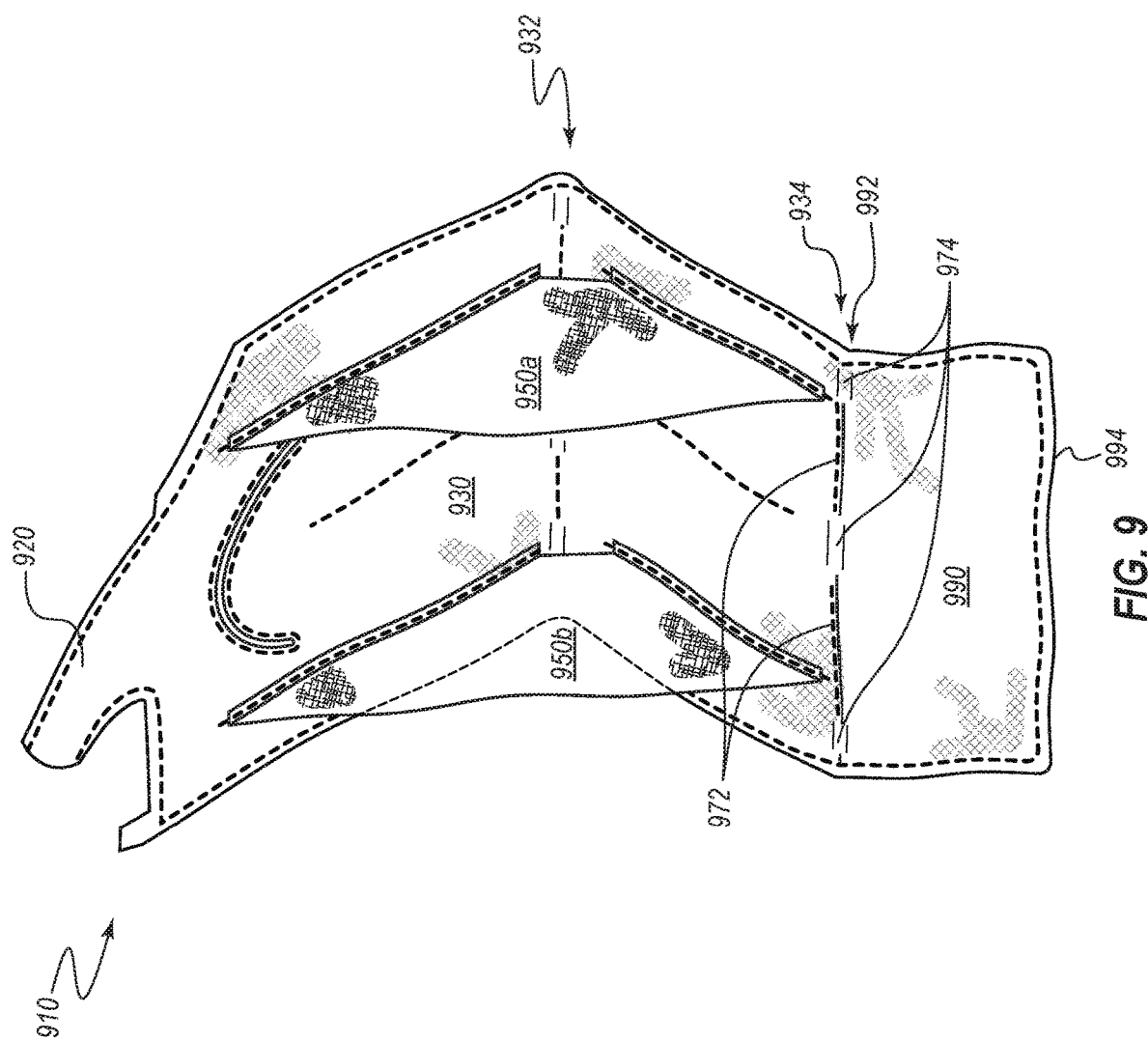
FIG. 9 is a perspective view of another embodiment of an inflatable chamber of an overhead inflatable airbag assembly similar to the overhead inflatable airbag assembly of FIGS. 1-3 and having a knee airbag chamber.

FIG. 9 is a perspective view of another embodiment of an inflatable cushion 910 of an overhead inflatable airbag assembly 900 similar to the overhead inflatable airbag assembly 100 of FIGS. 1-3 and having a knee airbag chamber 990. An inflation throat 920, an apex 932, and a distal end 934 of the main chamber 930 are shown, as are first and second sail panel tethers 950a, 950b. The knee airbag chamber 990 may be coupled at a coupling 992 at the distal end 934 of the main chamber 930. The inflatable cushion 910, including the main chamber 930 and knee airbag chamber 990, may be formed of a single, contiguous panel of material having appropriate cuts, folds, seams, pleats, etc., or may be formed of multiple panels of material coupled together via seams. The coupling 992 may comprise a series of zero-length horizontal tethers 972 and gaps 974. The gaps 974 may provide fluid communication of inflation gas to the knee airbag chamber 990 and between the knee airbag chamber 990 and main chamber 930. In another embodiment, the zero-length horizontal tethers 972 and gaps 974 may be supplanted through an internal tether similar to the internal tether 680 of FIGS. 6-7.

Figure 10:
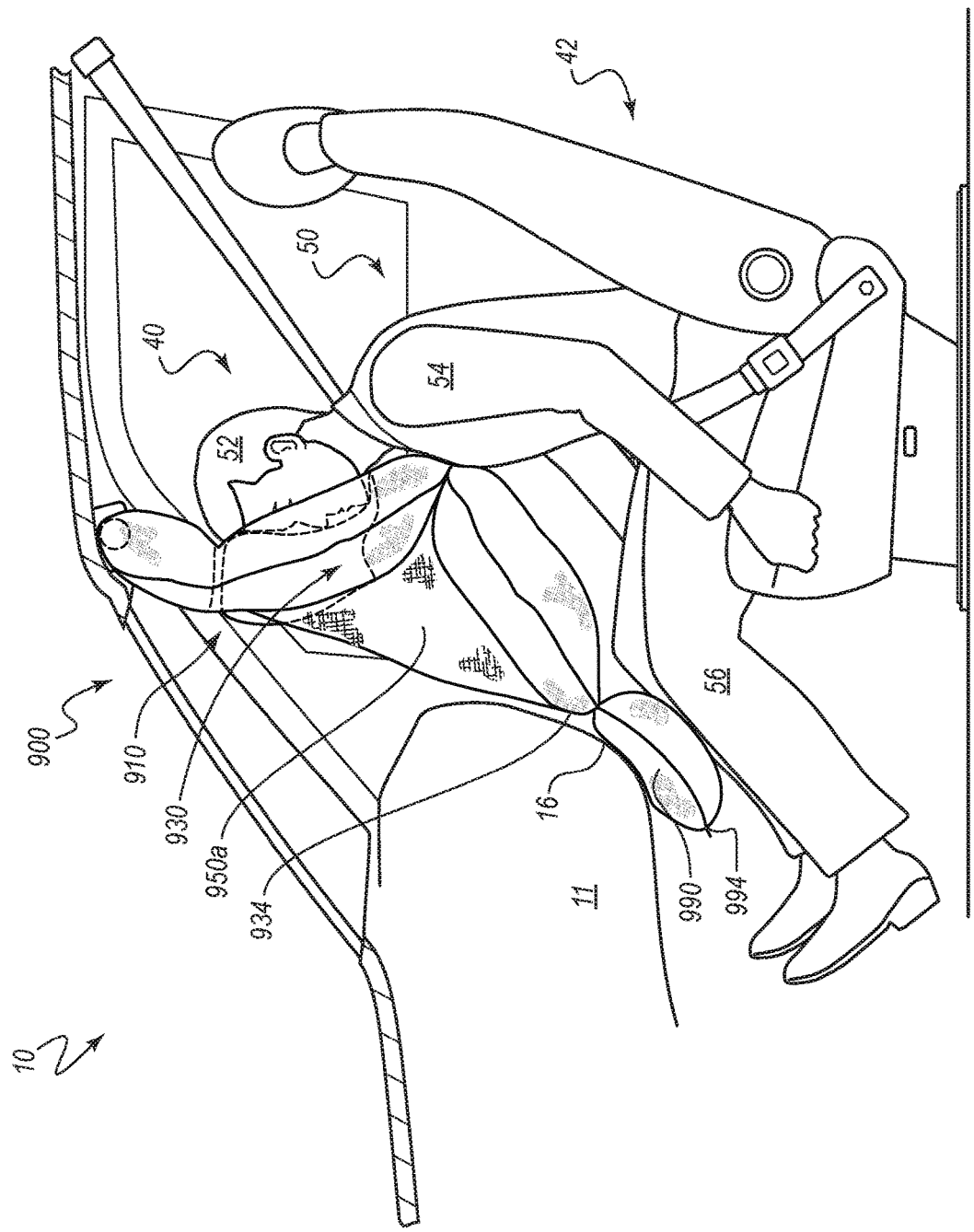
FIG. 10 is a side view of the interior of a vehicle having the overhead inflatable airbag assembly of FIG. 9 with the inflatable chamber deployed and at least partially inflated.

FIG. 10 is a side view of an interior of a vehicle 10 having the overhead inflatable airbag assembly 900 of FIG. 9 with the inflatable cushion 910 deployed and at least partially inflated. The main chamber 930, the first sail panel tether 950a, and the distal end 994 of the knee airbag chamber 990 are shown for reference. The occupant 50 is seated in the seat 42 of the vehicle seating position 40. The head 52 and torso 54 of the occupant 50 have engaged the main chamber 930. The lower legs 56 of the occupant 50 have engaged the knee airbag chamber 990 of the inflatable cushion 910. The knee airbag chamber 990 is shown having engaged the reaction surface 16 of the instrument panel/dashboard 11. The knee airbag chamber 990 and the distal end 934 of the main chamber 930 may engage the reaction surface 16 simultaneously or nearly simultaneously. While the embodiment of FIG. 10 shows the overhead inflatable airbag assembly 900 disposed to a front row vehicle seating position 40, another embodiment of the overhead inflatable airbag assembly 900 may be disposed to a vehicle seating position in another row similar to the embodiment of FIG. 2. An embodiment of the overhead inflatable airbag assembly 900 having the knee airbag chamber 990 may provide additional pelvis restraint and/or may reduce or prevent lower limb injury to an occupant 50 during a collision event and, in particular, to an unrestrained occupant 50.

Figure 11:
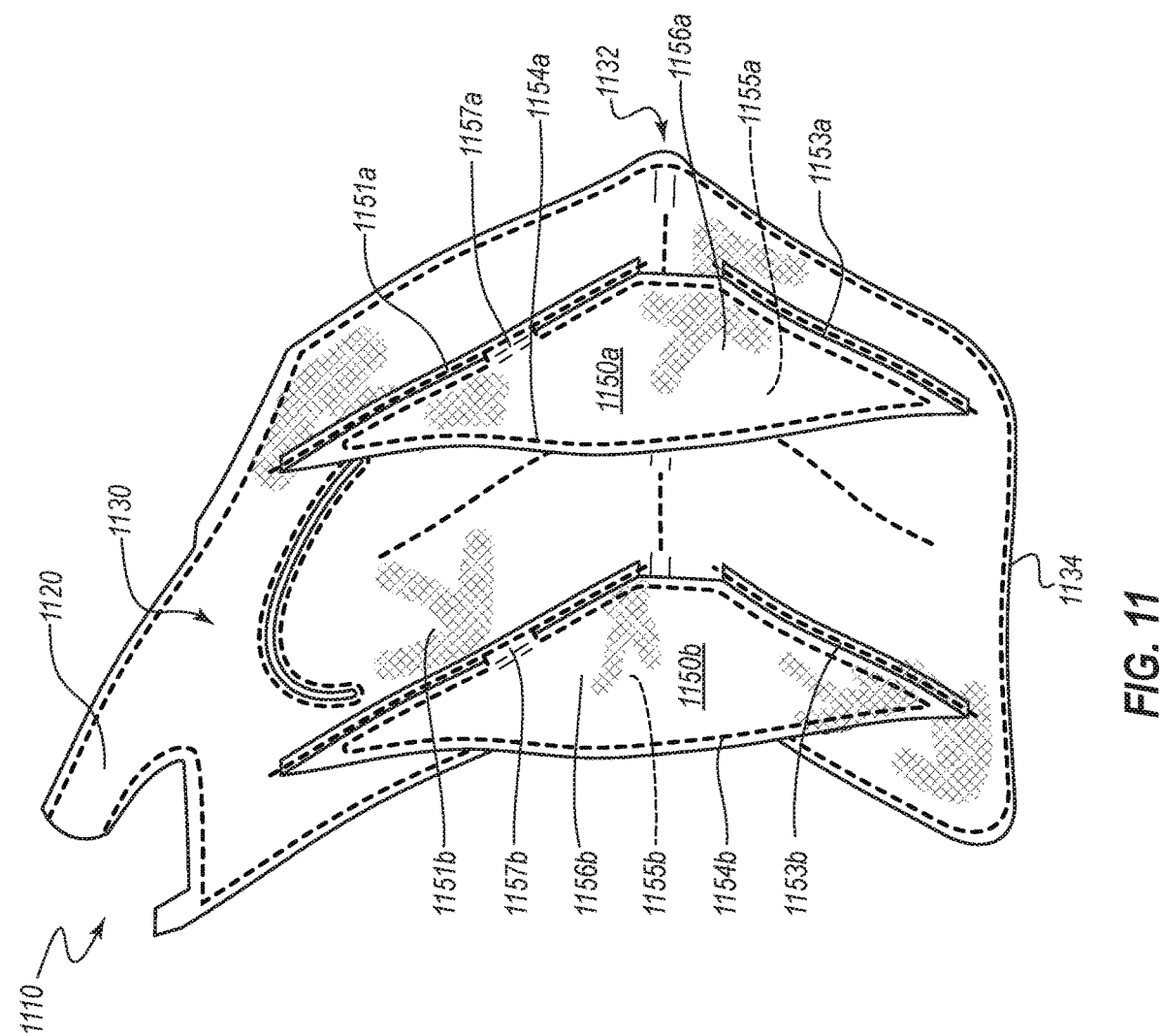
FIG. 11 is a perspective view of another embodiment of an overhead inflatable airbag assembly similar to that of FIGS. 1-3 and having at least a first inflatable sail panel tether.

FIG. 11 is a perspective view of another embodiment of an overhead inflatable airbag cushion 1110 of an overhead inflatable airbag assembly 1100 similar to that of FIGS. 1-3 and having at least a first inflatable sail panel tether 1150a. An inflation throat 1120, an apex 1132, and a distal end 1134 are shown for reference. The first sail panel tether is an inflatable sail panel tether 1150a. The first inflatable sail panel tether 1150a comprises at least an inboard panel 1155a and an outboard panel 1156a. The first inflatable sail panel tether 1150a may be formed of a single, contiguous panel of material having appropriate, cuts, folds, seams, pleats, etc., or may be formed of multiple distinct panels coupled together via seams. The first inflatable sail panel tether 1150a includes a first side 1151a and a third side 1153a which couple to the main chamber 1130. In the embodiment of FIG. 11, the first side 1151a of the first inflatable sail panel tether 1150a includes an inflation aperture 1157a to permit fluid communication of inflation gas from the main chamber 1130 to the first inflatable sail panel tether 1150a. In another embodiment, a second inflation aperture (not shown) may be incorporated in the third side 1153a of the first inflatable sail panel tether 1150a. In the embodiment of FIG. 11, a seam is shown along the fourth side 1154a of the first inflatable sail panel tether 1150a. In another embodiment, the seam at the fourth side 1154a may be supplanted by a fold.

The second inflatable sail panel tether 1150b may be similar to the first inflatable sail panel tether 1150a in major aspects. The second inflatable sail panel tether 1150b includes an inboard panel 1155b and an outboard panel 1156b. The second inflatable sail panel tether 1150b also includes a first side 1151b and a third side 1153b, which couple to the main chamber 1130, and a fourth side 1154b, which may include a seam or a fold. The first side 1151b of the second inflatable sail panel tether 1150b includes an inflation aperture 1157b. The third side 1153b may include a second inflation aperture (not shown).

Figure 12:
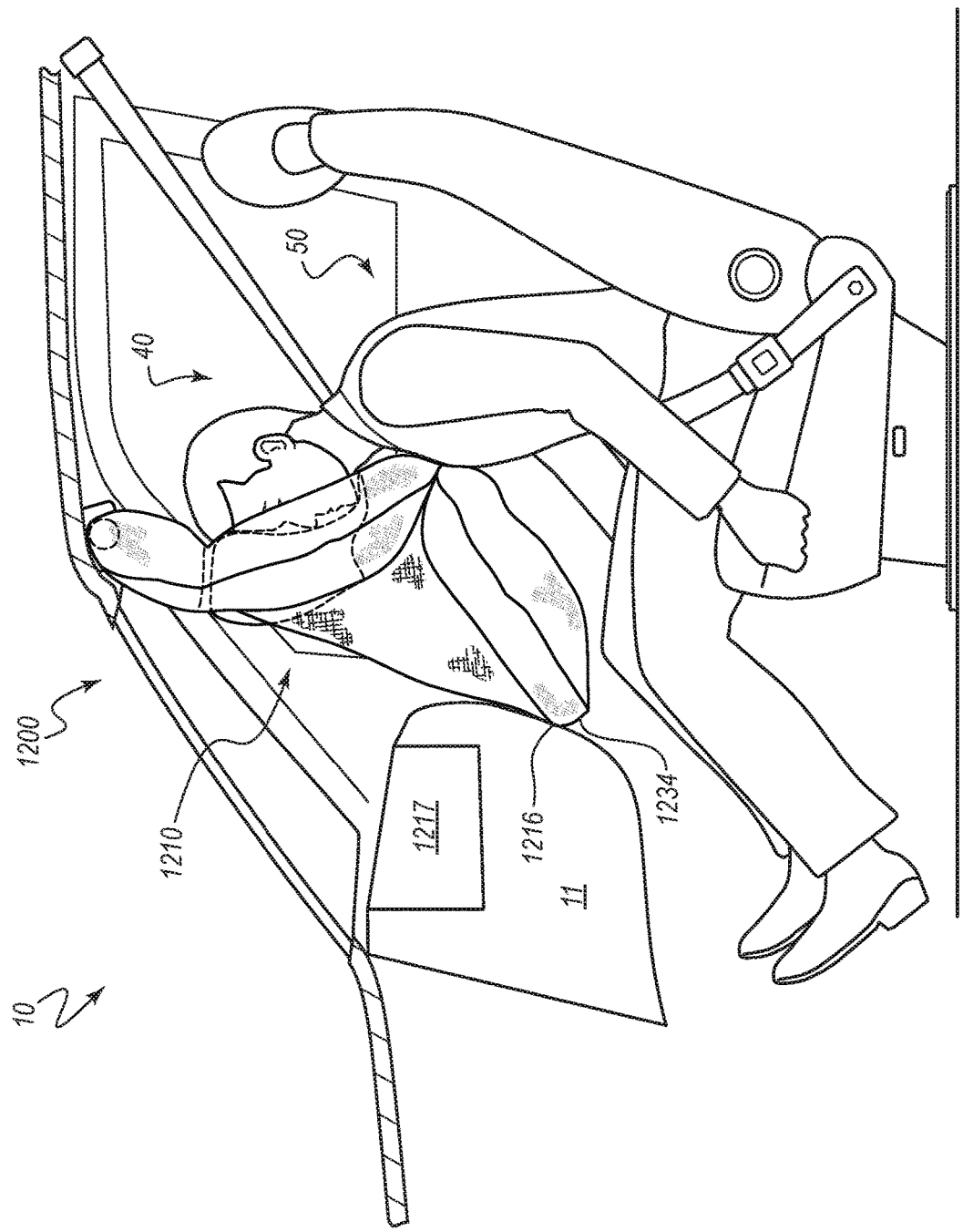
FIG. 12 is a side view of an interior of a vehicle having an embodiment of an overhead inflatable airbag assembly and an instrument panel/dashboard having a storage space.

FIG. 12 is a side view of an interior of a vehicle 10 having an embodiment of an overhead inflatable airbag assembly 1200 and an instrument panel/dashboard 11 having a storage space 1217. The overhead inflatable airbag assembly 1200 is deployed, and an inflatable cushion 1210 is at least partially inflated. The overhead inflatable airbag assembly 1200 may be any embodiment according to this disclosure. An occupant 50 is shown in the vehicle seating position 40.

The instrument panel/dashboard 11 is shown having a storage space 1217. Provided that the instrument panel/dashboard 11 includes the reaction surface 1216, the storage space 1217 may be an empty space useable for the convenience of the occupant 50; may be of any size or shape otherwise suitable for the vehicle 10; may be open on more sides; if open on any side, may be closeable; or may be useable for other purposes related to the operation of the vehicle; or any combination of these.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An overhead inflatable airbag cushion comprising:
a main chamber; and
a sail panel tether that couples to an upper portion of the main chamber and to a lower portion of the main chamber, wherein the length of the sail panel tether is less than the length of the main chamber,
wherein, in an inflated deployed state, a portion of the upper portion extends in a direction toward a vehicle seating position and a portion of the lower portion extends in a direction away from the vehicle seating position, the upper portion and the lower portion forming an apex at the change in direction,
wherein the sail panel tether has a first edge and a second edge opposite the first edge, the first and second edges extending from the upper portion to the lower portion, and the first edge is shorter than the second edge, and
wherein the upper portion includes an arc-shaped slot disposed in the upper portion of the main chamber.

2. The overhead inflatable airbag cushion of claim 1, wherein the sail panel tether has an irregular quadrilateral shape.

3. The overhead inflatable airbag cushion of claim 1, wherein the main chamber includes a zero-length tether disposed along the apex and the zero-length tether extends horizontally along the main chamber.

4. The overhead inflatable airbag cushion of claim 1, wherein the main chamber includes a plurality of zero-length tethers that are interspersed along the apex and extend horizontally along the main chamber.

5. The overhead inflatable airbag cushion of claim 1, wherein the main chamber includes an internal tether disposed within the main chamber and along the apex, wherein the internal tether includes a plurality of vents.

6. The overhead inflatable airbag cushion of claim 1, wherein, in the inflated deployed state, the sail panel tether controls the shape of the main chamber after an occupant engages the main chamber.

7. The overhead inflatable airbag cushion of claim 1, wherein, in the inflated deployed state, the apex is engageable with a torso of an occupant.

8. The overhead inflatable airbag cushion of claim 1, further comprising two sail panel tethers that are horizontally offset an offset distance.

9. The overhead inflatable airbag cushion of claim 1, wherein a first end of the sail panel tether couples along a majority of the upper portion of the main chamber and a second end of the sail panel tether couples along a majority of the lower portion of the main chamber.

10. The overhead inflatable airbag cushion of claim 1, wherein the sail panel tether is inflatable.

11. The overhead inflatable airbag cushion of claim 1, wherein the upper portion includes a non-inflated zone for receiving an occupant's head when the occupant engages the main chamber.

12. The overhead inflatable airbag cushion of claim 1, wherein in the inflated deployed state, a lower edge of the main chamber engages with a reaction surface, and wherein the reaction surface is one of an instrument panel of a vehicle and a seat back of a vehicle seating position.

13. The overhead inflatable airbag cushion of claim 1, wherein the main chamber further extends downward a predetermined length at a lower edge of the lower portion of the main chamber.

14. The overhead inflatable airbag cushion of claim 1, wherein the main chamber includes at least two panels that are coupled to each other along the outer edges of each panel to form the main chamber.

15. An overhead inflatable airbag cushion comprising: a main chamber, wherein in an inflated deployed state, a portion of the main chamber forms two edges of a V-shape and an apex between the two edges,
   wherein the main chamber maintains the V-shape and resists an occupant's forward movement after the occupant engages the main chamber,
   wherein the main chamber is configured to engage a reaction surface during occupant loading of the overhead inflatable airbag cushion,
   wherein the apex is configured to engage with a torso of the occupant,
   wherein the main chamber includes a zero-length tether disposed along the apex, and wherein sail panel tethers couple to an upper portion of the main chamber and to a lower edges of the V-shape, wherein a first end of the sail panel tethers couples to the upper portion of the main chamber and a second end of the sail panel tethers couples to the lower portion of the main chamber and wherein the sail panel tethers are set apart an offset distance.

16. The overhead inflatable airbag cushion of claim 15, wherein the sail panel tethers have a quadrilateral shape.

17. The overhead inflatable airbag cushion of claim 15, wherein the sail panel tethers have an irregular quadrilateral shape.

18. The overhead inflatable airbag cushion of claim 15, wherein the sail panel tethers have a triangular shape.

19. An overhead inflatable airbag assembly comprising:
   a housing to mount at a roof of an interior of a vehicle;
   an inflator to supply inflation gas; and
   an overhead inflatable airbag cushion disposed within the housing to receive inflation gas from the inflator and deploy from the housing, the overhead inflatable airbag cushion comprising:
      a main chamber; and
      a sail panel tether that couples an upper portion of the main chamber and to a lower portion of the main chamber, wherein the length of the sail panel tether is less than the length of the main chamber,
      wherein, in an inflated deployed state, a portion of the upper portion extends in direction toward a vehicle seating position and a portion of the lower portion extends in a direction away from the vehicle seating position, the upper portion and the lower portion forming an apex at the change in direction,
      wherein the sail panel tether has a first edge and a second edge opposite the first edge, the first and second edges extending from the upper portion to the lower portion, and the first edge is shorter than the second edge, and
      wherein the main chamber further extends downward a predetermined length at a lower edge of the lower portion of the main chamber.

20. The overhead inflatable airbag assembly of claim 19, wherein the main chamber includes a zero-length tether disposed along the apex and the zero-length tether extends horizontally along the main chamber.

21. The overhead inflatable airbag assembly of claim 19, wherein, in the inflated deployed state, the tether controls the shape of the main chamber after an occupant engages the main chamber.

* * * * *

UNITED STATES PATENT AND TRADEMARK OFFICE
CERTIFICATE OF CORRECTION

PATENT NO. : 10,583,799 B2
APPLICATION NO. : 15/969560
DATED : March 10, 2020
INVENTOR(S) : David W. Schneider and Frank J. Herzenstiel It is certified that error appears in the above-identified patent and that said Letters Patent is hereby corrected as shown below:

In the Claims

Column 14, Line 60 Claim 12 reads, "wherein in the inflated deployed state" which should read, "wherein, in the inflated deployed state"

Column 15, Line 6 Claim 15 reads, "main chamber, wherein in an inflated deployed state" which should read, "main chamber, wherein, in an inflated deployed state"

Column 15, Lines 18-21 Claim 15 read, "disposed along the apex, and wherein sail panel tethers couple to an upper portion of the main chamber and to a lower edges of the V-shape" which should read, "disposed along the apex, wherein sail panel tethers couple to an upper portion of the main chamber and to a lower portion of the main chamber, the upper portion and the lower portion forming respective edges of the V-shape"

Column 15, Lines 24-26 Claim 15 read, "couples to the lower portion of the main chamber and wherein the sail panel tethers are set apart an offset distance." which should read, "couples to the lower portion of the main chamber, and wherein the sail panel tethers are set apart an offset distance."

Column 16, Line 9 Claim 19 reads, "a sail panel tether that couples an upper portion of the" which should read, "a sail panel tether that couples to an upper portion of the"

Column 16, Line 14 Claim 19 reads, "upper portion extends in direction toward a vehicle" which should read, "upper portion extends in a direction toward a vehicle"

Signed and Sealed this
Thirtieth Day of June, 2020

Andrei Iancu
*Director of the United States Patent and Trademark Office*